United States Patent [19]

Lam

[11] Patent Number: 4,980,406

[45] Date of Patent: Dec. 25, 1990

[54] FORTIFIED POLYACRYLATE RESINS

[75] Inventor: Patrick W. Lam, Sarnia, Canada

[73] Assignee: Polysar Limited, Sarnia, Canada

[21] Appl. No.: 223,015

[22] Filed: Jul. 22, 1988

[51] Int. Cl.$^5$ .......................... C08K 3/04; C08K 3/26; C08K 3/34; C08K 3/40

[52] U.S. Cl. .................................. 525/426; 524/445; 524/451; 524/525; 524/538; 525/233

[58] Field of Search ............... 524/426, 445, 451, 525, 524/538; 525/233

[56] References Cited

U.S. PATENT DOCUMENTS 3,857,812 12/1974 Nowak et al. .
4,327,013 4/1982 Peters .
4,720,526 1/1988 Roland ................................ 524/521

OTHER PUBLICATIONS

Paul D. McLean et al., "Fortifiers for Epoxy-Amine Systems", The British Polymer Journal, vol. 15, pp. 66–70, 1977.

*Primary Examiner*—Allan M. Lieberman
*Attorney, Agent, or Firm*—Stevens, Davis, Miller & Mosher

[57] ABSTRACT

The present invention relates to thermosetting polyacrylate compositions having surprising impact strength and glass transition temperature properties.

The compositions are prepared with a selected acrylate monomer, a copolymerizable unsaturated monomer, and a selected nitrile rubber and are cured with a free radical curing agent.

The compositions are suitable for use in molding compounds.

9 Claims, No Drawings

FORTIFIED POLYACRYLATE RESINS

This invention relates to thermosetting polyacrylate compositions having surprising impact strength and glass transition temperature properties. The compositions contain an acrylate monomer, an ethylenically unsaturated monomer, a selected nitrile rubber additive, and are cured with free radical curing agents.

Thermosetting molding resins produced with acrylate monomers resin are well known. For example, U.S. Pat. No. 4,327,013, to Peters, discloses a polyacrylate molding composition containing an hydroxy free acrylate monomer, such as ethoxylated bisphenol-A dimethacrylate, and a monoethylenically unsaturated monomer, such as styrene. More specifically, this patent relates to fiber reinforced composites made from the resin. The patent does not contemplate the use of additives to improve the properties of the base resin.

The polyacrylate resins described above generally suffer from having relatively low ductility, which is a deficiency that is common to many thermosetting resins. Impact strength and work of fracture(fracture toughness) are generally accepted measures of the ductility of a material. It is known to improve the ductility of some brittle thermoset resins by blending them with softer, more ductile materials. For example, U.S. Pat. No. 3,857,812 teaches that the impact strength of unsaturated polyester resin (which is another well known thermosetting resin) is improved by the addition of styrene-butadiene rubber.

However, an improvement in the ductility of a thermoset resin which is achieved by adding a rubber is typically made at the expense of other properties, particularly the glass transition temperature Tg. That is, the addition of a rubbery material with a low Tg typically decreases the Tg of the toughened resin.

Thus, there is a desire to improve both the Tg and impact strength of thermoset resins.

It is known to use oligomeric additives to increase the strength properties of certain epoxy resins without causing a large decrease in Tg. For example, as disclosed in the British Polymer Journal, vol. 15 (1977), p. 66, the reaction product of acetoacetamilide and vinyl cyclohexane dioxide gives an additive which improves the strength properties of amine cured epoxy resin without causing a substantial decrease in the glass transition temperature. This surprising result led to the use of the word "epoxy fortifier" to describe the performance of the additive.

It would be desirable to develop "fortifiers" for other thermoset resins, particularly polyacrylate resins.

It has been found as a result of the present invention that the use of selected nitrile rubber can provide a surprising improvement in both impact strength and Tg properties of certain polyacrylate-containing thermosetting resins.

Accordingly, the present invention provides a curable composition comprising:

(a) from 10 to 70 parts by weight of an acrylate monomer selected from:

(ai) an acrylate characterized by the empirical formula:

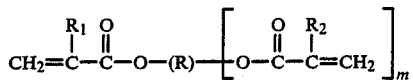

where R is the hydroxy free residue of a polyol and $R_1$ and $R_2$ are independently hydrogen or methyl and m is from 1 to 3, and (aii) and acrylate characterized by the empirical formula:

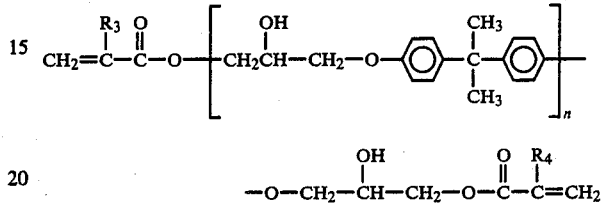

where n is from 1 to 1.5 and $R_3$ and $R_4$ are independently hydrogen or methyl and correspondingly, (b) from 90 to 30 parts by weight of an ethylenically unsaturated monomer which is soluble in and copolymerizable with said acrylate monomer, such that the combined weight of said acrylate monomer and unsaturated monomer is 100 parts, and such that the total of said (a) plus said (b) is 100 parts by weight, and (c) from 1.0 to 50 parts by weight of a selected nitrile rubber per 100 parts combined weight of said acrylate monomer plus said ethylenically unsaturated monomer, and (d) from 0.2 to 3 parts by weight per 100 parts combined weight of said acrylate monomer plus said ethylenically unsaturated monomer of a free radical curing agent, characterized in that said selected nitrile rubber is selected from the group consisting of:

(i) a solid, rubbery copolymer of a $C_{3\ to\ 5}$, unsaturated nitrile and a $C_{4-6}$ conjugated diene, said copolymer having a Mooney viscosity ($M_L1+4$ at 100° C.) of from 20 to 100;

(ii) a solid carboxylated rubbery copolymer of acrylonitrile, butadiene and at least one carboxylic acid selected from acrylic, methacrylic, fumaric, maleic and itaconic acid, said carboxylated rubbery copolymer having a Mooney viscosity ($M_L1+4$ at 100° C.) of from 20 to 100; and (iii) a liquid copolymer of acrylonitrile and butadiene having a molecular weight of less than 30,000 and terminal vinyl functional groups.

In another embodiment of the invention, there is provided a process to prepare a molding composition having surprising impact strength and glass transition temperature properties.

DETAILED DESCRIPTION

The acrylate monomer (ai) above is characterized by the following empirical formula:

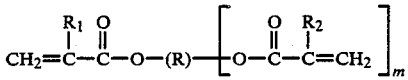

where m is from 1 to 3, $R_1$ and $R_2$ are independently hydrogen or methyl (i.e. $CH_3$) residue of and where R is an hydroxy free residue of a polyol (i.e. an alcohol having at least 2 alcoholic OH groups). This monomer may be further characterized as being free of OH (hydroxy) functionality. Specific examples of suitable acrylate monomers include ethoxylated bisphenol-A dimethyacrylate, propoxylated bisphenol-A dimethacrylate, triethylene glycol dimethyacrylate, diethylene glycol dimethacrylate, and pentacrythritol trimethyacrylate.

The above hydroxy-free acrylate monomers may be prepared by reacting a polyol with either a carboxylic acid such as acrylic or methacrylic acid, or with the simple ester of the carboxylic acid.

Specific examples of suitable polyols include alkane polyols such as diethylene glycol, propylene glycol, triethylene glycol and 1, 4 butanediol, and ring containing diols such as 2, 2-bis 4 (-hydroxyphenol) propane. More than one of the above polyols may suitably be used in the preparation of the acrylate monomer.

The other suitable acrylate monomer, noted (aii) above, is characterized by the following empirical formula:

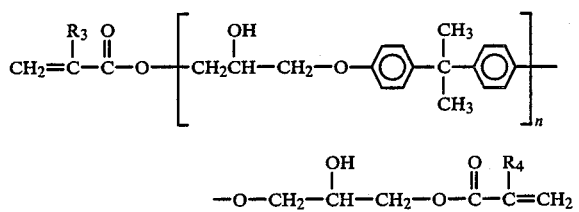

where n is from 1 to 1.5 and $R_3$ and $R_4$ are independently hydrogen or methyl.

The acrylate monomer (aii) is prepared by reacting a bisphenol A epoxy monomer with methacrylic acid or methyl methacrylate. The resulting acrylate monomer (aii) does not contain epoxy functionality and hence is not an epoxy resin. The resulting acrylate monomer (aii) is conventionally referred to as a vinyl ester resin.

The term ethylenically unsaturated monomer as used herein refers to a monomer, or mixture of monomers, which is copolymerizable in a free radical polymerization with an acrylate monomer. Specific examples of suitable ethylenically unsaturated monomers include vinyl aromatic monomers such as styrene, $\alpha$-methyl styrene, p-methyl styrene, halo substituted styrene such as chloro styrene, divinyl benzene, low molecular weight acrylate monomers such as methyl methacrylate and methyacrylate; and acrylic or methyacrylic acid for reasons for cost and simplicity, the use of styrene is preferred.

The composition of the present invention are cured with a free radical curing agent. It is well known to those skilled in the art that suitable curing agents are those which are both stable enough to be safely handled at low temperatures and yet active enough to induce cure at a temperature which is low enough to prevent degradation of the monomers.

Suitable free radical curing agents include peroxy curing agents such as dicumyl peroxide, tertiary butyl peroxy benzoate, benzoyl peroxide, dibutyl peroxide, tertiary butyl peroctoate, tertiary amyl peroxy (2-ethyl hexanoate) and azo initiators such as azoisobutyronitrile.

The present compositions may be employed in non-reinforced molding compounds, or in molding compounds which are thickened and are reinforced with fibers, or in molding compounds which contain non-fibrous compounding additives.

The compositions of the present invention are suitable for certain contact molding (both hand lay-up and spray-up), pultrusion and filament winding applications.

Hand lay-up is a conventional technique in which fiber-reinforced resin is fitted to a mold in a layer by layer process. This technique is used for large moldings, such as boats, or for small production runs which do not justify the cost of a more expensive mold.

The spray-up process is similar to hand lay-up, except that spray guns are used to deposit the resin and chopped fiber onto the mold.

Pultrusion technology is used to prepare composite parts into profile shapes. The profile shape is obtained by drawing continuous fibers or fiberglass mat through a filled or unfilled resin bath and subsequently through a high temperature die. This technology is used to prepare, for example, tubings and structural components such as I-beams.

Filament winding is a process wherein fibers are impregnated with filled or unfilled resin and wound around a mandrel to provide the desired shape. Fiber-reinforced resin pipes are typically prepared using this technology. The compositions of the present invention are also suitable for other types of fiber - reinforced compounding techniques including SMC (sheet molding compound) BMC (bulk molding compound) and RTM (Resin transfer molding).

The compositions of the present invention may also be compounded with non-fibrous reinforcing agents and fillers such as talc, clay, carbon black, glass flakes, graphite, metal powders, titanium oxide and calcium carbonate. When employed, the amount of non-fibrous reinforcing agent/filler is suitably between 5 and 75 weight per cent, based on the combined weight of the acrylate monomer and the ethylenically unsaturated monomer.

It is essential to the present invention to include a nitrile rubber selected from:

(i) a solid rubbery copolymer of a $C_3$ to 5, $\beta$ unsaturated nitrile and a $C_4$ to 6 conjugated diene, and (ii) a solid rubbery copolymer of acrylonitrile, butadiene and a carboxylic acid selected from acrylic, methacrylic, itaconic, fumaric and maleic acids;

(iii) a liquid copolymer of acrylonitrile and butadiene having a number average molecular weight of less than 30,000 and terminal vinyl functional groups.

The solid copolymer denoted (i) above may be produced by the well-known free radical emulsion polymerization process. A typical example is solid acrylonitrile-butadiene rubber (NBR), which normally contains from 15 to 45 weight per cent bound acrylonitrile units (especially from 25 to 38 weight per cent), with the balance being butadiene. Solid NBR typically has a Mooney viscosity ($M_L1+4$ at 100° C.) of from 20 to 100.

The solid rubbery copolymer denoted (ii) above may also be produced by the free radical emulsion polymerization process. Such copolymers are referred to as carboxylated nitrile rubber, or "XNBR". Carboxylated nitrile rubbers are copolymers of butadiene, acrylonitrile and one or more 60, 62 unsaturated carboxylic acids. The carboxylic acids may contain one or more carboxylic groups. Because of cost and availability, it is preferred that the carboxylic acids be selected from acrylic, methacrylic, fumaric, maleic and itaconic acids. The bound acrylonitrile content of the copolymer may be from about 20 to about 40 weight per cent. The total content of the bound carboxylic acid is from about 0.5 to about 10 weight per cent. Butadiene units form the balance to 100 weight per cent of the copolymer. Solid XNBR typically has a Mooney viscosity ($M_L1+4$ at 100° C.) of from 40 to 80.

Nitrile rubber (iii) is a liquid polymer of acrylonitrile and butadiene having vinyl end groups. An example of this liquid polymer is sold under the trade name VTBNX 1300X24 by B. F. Goodrich.

The nitrile rubber employed in the present invention must be one of those described above. The use of other nitrile rubbers is not contemplated.

The use of a liquid nitrile rubber having carboxyl end groups ("liquid carboxylated nitrile rubber"), or a liquid nitrile rubber having amino end groups, is specifically excluded because, for reasons which are not completely understood, neither provides acceptable results.

The composition of the present invention is prepared by blending at least one of the selected nitrile rubbers, at least one of the selected acrylate monomers and at least one of the ethylenically unsaturated monomers and curing the composition with a free radical curing agent.

It is highly preferred to mix the rubber and ethylenically unsaturated rubber (which may form a solution) before adding the acrylate monomer.

Preferred resin compositions contain from 20 to 40 parts by weight of acrylate monomer and the balance to 100 parts by weight of ethylenically unsaturated monomer, together with from 5 to 20 parts by weight of the selected nitrile rubber per 100 parts by weight monomer.

The preferred compositions contain about 1 weight per cent of a peroxy curative.

Highly preferred compositions are fiber reinforced with from 20 to 50 parts by weight of fiberglass per 100 parts by weight resin.

The present invention will now be explained in detail by reference to the following non-limiting examples. Unless otherwise indicated, all percentages and parts are by weight.

EXAMPLE 1

Molding resins having the compositions shown in Table 1 were prepared as follows. When employed, the acrylonitrile butadiene rubber was added to styrene monomer and mixed for 24 to 48 hours to give a generally homogeneous mixture. Ethoxylated bisphenol-A dimethacrylate (EBAD) was then added to the styrene mixture. The weight ratio of styrene monomer to ethoxylated bisphenol A dimethacrylate was 66/34 for all experiments in this example.

The resulting resin composition was then molded in a glass mold consisting of two parallel glass plates separated by a 0.16 cm. thick rubber gasket. The gasket contained square cavities, having dimensions of 15 cm X 15 cm in which the resin was cured to provide test specimens. The glass plates and gaskets were lightly coated with a mold release agent.

The resin was cured with tertiary butyl perbenzoate (TBPB) for 5 hours at 80° C., followed by 16 hours at 100° C. and 2 hours at 150° C.

The fracture toughness test was completed on single edge notched specimens having dimensions of (6.5 cm X 0.64 cm X 0.16 cm), using a MINIMAT materials tester at a constant crosshead speed of 1.0 mm/min. and ambient temperature to determine the critical stress intensity factor ($K_{IC}$).

$K_{IC}$ is calculated according to the linear elastic fracture mechanics equation:

$$KIC_{IC} = (S_i) \times (Y) \times (a_0)^{0.5}$$

where
$S_i$ = stress at initiation of unstable crack propagation $$y = 1.99 - 0.41(a_0/w) + 18.7 (a_0/w)^2 - 38.48 (a_0/w)^3 + 53.85 (a_0/w)^4$$

$a_0$ = initial crack length $w$ = width of sample specimen

Work of fracture ($G_{IC}$) is then calculated by the following equation:

$$G_{IC} = (K_{IC})^2/E$$

where
E = Young's modulus of the cured resin (from the initial stress/strain curve)

Glass transition temperature (Tg) was measured using a dynamic mechanical test on an viscoelastic spectrometer manufactured by Iwamoto, at a temperature gradient of 2° C./mi and a frequency of 10 Hz. The dynamic mechanical test was completed at a constant strain amplitude of −0.035 mm. The Tg is determined by the peak of the loss factor(tan delta) curve.

The results from Example 1 are shown in Table 1.

The inventive compositions 2, 3, 4 and 5 surprisingly exhibit both a higher work of fracture and a higher glass transition temperature in comparison to control Experiment 1.

The nitrile rubbers used in the inventive experiments of this and the following examples are defined as follows:

NBR1: A solid acrylonitrile-butadiene rubber produced by free radical emulsion polymerization, having a bound acrylonitrile content of about 34% and a Mooney viscosity ($M_L1+4$ at 100° C.) of about 65.

NBR2: A solid acrylonitrile-butadiene rubber produced by free radical emulsion polymerization, having a bound acrylonitrile content of about 19% and a Mooney viscosity ($M_L1+4$ at 100° C.) of about 50.

NBR3: A solid acrylonitrile butadiene rubber produced by free radical polymerization, having a bound acrylonitrile content of about 38% and a Mooney viscosity ($M_L1+4$ at 100° C.) of about 50.

NBR4: A solid acrylonitrile butadiene rubber produced by free radical emulsion polymerization, having a bound acrylonitrile content of about 34 and a Mooney viscosity ($M_L1+4$ at 100° C.) of about 35.

NBRVL: A liquid nitrile rubber, having a Brookfield viscosity (centipoise at 250° C.) of 470±250 and vinyl functional groups, sold under the tradename Hycar 1300 X 24 (VTBNX) by B. F. Goodrich.

TABLE 1

| Experiment | Modifier | Amount Modifier (%) | Work of Fracture (kJ/m²) | Glass Transition Temperature (°C.) |
| --- | --- | --- | --- | --- |
| 1 | none | 0 | 0.9 | 128 |
| 2 | NBR1 | 12 | 2.4 | 143 |
| 3 | NBR2 | 12 | 1.2 | 142 |
| 4 | NBR3 | 12 | 1.5 | 138 |

TABLE 1-continued

| Experiment | Modifier | Amount Modifier (%) | Work of Fracture (kJ/m$^2$) | Glass Transition Temperature (°C.) |
|---|---|---|---|---|
| 5 | NBRVL | 12 | 1.4 | 143 |

EXAMPLE 2

This example illustrates resins prepared from a relatively high amount of ethoxylated bisphenol-A dimethacrylate monomer and a minor amount of styrene monomer.

The weight ratio of EBAD monomer to styrene monomer was 60/40 in all experiments. A comparative experiment was completed without any nitrile rubber. 10 weight per cent nitrile rubber was used in the inventive experiments. The nitrile rubber was included by substantially dissolving it in styrene before adding the EBAD.

The resins were cured with 1% TBPB, molded, and tested according to the procedures described in Example 1. Once again, improvements in both Tg and work of fracture are demonstrated.

TABLE 2

| Experiment | Modifier | Amount Modifier | Work of Fracture (kJ/m) | Glass Transition Temperature (°C.) |
|---|---|---|---|---|
| 10 | none | 0 | 0.55 | 152 |
| 11 | NBR1 | 10 | 0.93 | 163 |
| 12 | NBR3 | 10 | 0.77 | 158 |
| 13 | NBR4 | 10 | n.m. | 163 |
| 14 | NBRVL | 10 | n.m. | 165 |

NOTES:
Weight ratio of EBAD/Styrene was 60/40 for all experiments
n.m. = not measured

EXAMPLE 3 (Comparative)

Table 3 provides data from comparative experiments in which rubbers other than the selected nitrile rubbers were employed. In each case, the addition of the rubber produced a resin with a lower fracture toughness than a resin prepared without a rubber additive. Comparative Experiments 23 and 24 are particularly significant, because they utilize a liquid nitrile rubber having carboxyl end groups (experiment 23) or a liquid nitrile rubber having amino end groups (experiment 24).

The weight ratio of EBAD/Styrene monomers was 30/58 in all cases.

The resins of this example were cured with 1% TBPB, molded and tested according to the procedures described in Example 1.

The rubbers employed are described below. SBR1 was an emulsion polymerized, styrene-butadiene copolymer having a bound styrene monomer content of about 23%, a bound butadiene monomer content of about 77%, and a Mooney viscosity (ML 1+4 at 100° C.) of about 50.

BR1 was a solution polymerized, high cis solid polybutadiene having a Mooney viscosity (ML 1+4 at 100° C.) of about 40. NBRLX was a liquid acrylonitrile-butadiene rubber having carboxylic acid functional groups, available from B. F. Goodrich under the tradename Hycar CTBNX 1300X18. NBRLN was a liquid acrylonitrile-butadiene rubber having amino end groups, sold under the tradename Hycar ATBNX 1300x16 by B. F. Goodrich. BRLA was a liquid polybutadiene having acrylate functionality, available from Sartomer Limited under the tradename Acrylated Polybutadiene C5000.

TABLE 3

| Experiment | Modifier | Amount Modifier (%) | Work of Fracture (kJ/mm$^2$) |
|---|---|---|---|
| 20 | none | 0 | 0.90 |
| 21 | SBR 1 | 12 | 0.84 |
| 22 | BR1 | 12 | 0.65 |
| 23 | NBRLX | 12 | 0.35 |
| 24 | NBRLN | 12 | 0.48 |
| 25 | BRLA | 12 | 0.83 |

EXAMPLE 4

This example illustrates the fortification of a vinyl ester resin.

The vinyl ester resin was prepared as follows: approximately 50 grams of a bisphenol A epoxy resin (sold under the tradename DER 332 by Dow Chemical Company) was added to a flask with approximately 0.5 g. tributyl phosphite. This mixture was heated at about 100° C. for about 1 hour. About 0.1 g. of tetramethyammonium chloride, about 0.05 g. methyl hydroquinone and about 22 g. of methacrylic acid were then added. The mixture was heated at about 100° C. for 3 hours and then further heated at about 115° C. for 8 hours.

Molding resins having the composition shown in Table 4 were then prepared according to the procedures described in Example 1, using the vinyl ester resin instead of EBAD. The weight ratio of vinyl ester to styrene was 60/40.

As shown in Table 4, both of the work of fracture and Tg of the composition of inventive experiment 41 are superior to the same properties of the composition of comparative experiment 40.

TABLE 4

| Experiment | Modifier | Amount Modifier (%) | Work of Fracture (kJ/m$^2$) | Tg (°C.) |
|---|---|---|---|---|
| 40 (comparative) | none | 0% | 0.53 | 142 |
| 41 | NBR3 | 12% | 1.02 | 163 |

EXAMPLE 5

This example illustrates the use of a mixture of two hydroxy free acrylate monomers and styrene monomer.

In Experiment 40 and 41, EBAD, trimethylolpropane trimethacrylate monomer (another hydroxy free acrylate) and styrene were used in a weight ratio of 20/10/58 - and 35/10/45 respectively. Experimental data is shown in Table 5. The resins were cured with 1% TBPB, molded and tested according to the procedures described in Example 1.

TABLE 5

| Experiment | Modifier | Amount Modifier (%) | Work of Fracture (kJ/m$^2$) |
|---|---|---|---|
| 50 | NBR | 12 | 1.9 |
| 51 | NBR | 10 | 2.2 |

EXAMPLE 6

This example illustrates the use of the inventive resins in pultruded components. A base resin was prepared with EBAD and styrene in a weight ratio of 54/36. The resin was modified with 10% of NBR by adding a solution of NBR1 in styrene. The resin was compounded with fiberglass (E-glass) to give a composite containing about 40% fiberglass.

Approximately 1% TBPB (basis of combined weight of styrene plus EBAD) was included in the composite. A pultruded sample was cured inside a die at 80° C. for 2 hours, 100° C. for 4 hours and postcured at 150° C. for 2 hours.

The pultruded sample was then subjected to a notched Izod impact test. The test was similar to that described in ASTM D256, except that the notch size was $\frac{1}{8}''$ wide by $\frac{1}{4}''$ deep (twice the conventional standard), in order to ensure a clean break. The impact strength was found to be 1.77 kJ/m.

The procedure generally described immediately above was completed again using a base resin having a weight ratio of 54/36 (EBAD/Styrene). The base resin was again compounded with glass fibers to give a composite containing about 40% fiberglass, pultruded, and cured with 1% TBPB as described above.

The resulting composite was tested as described above and found to have a notched impact strength of 2.42 kJ/m.

EXAMPLE 7

The example illustrates the preparation of a bulk molding compound (BMC) from resins of the present invention.

A base resin containing EBAD and styrene in a 54/36 weight ratio was prepared. The resin contained 10 weight per cent of NBR3, and the nitrile rubber was included by substantially dissolving it in the styrene prior to mixing with EBAD.

A BMC paste was then prepared by adding to a mixer: 16.5% of the above base resin, 16.5% of polyvinyl acetate (sold under the tradename Neulon T by Union Carbide), 0.2% of a black pigment, 0.3% tertiary butyl perbenzoate, 0.7% zinc stearate and 50.8% calcium carbonate. The paste was then compounded with about 15% of 1.3 cm long chopped glass fibers in a sigma blade mixer for 3 minutes.

The flex strength and flex modulus of the resulting composite were measured according to ASTM D790 and found to be 80 MPa and 7.2 GPa, respectively.

What is claimed is:

1. A curable composition comprising:
(a) from 10 to 70 parts by weight of an acrylate monomer selected from:
(ai) An acrylate characterized by the empirical formula:

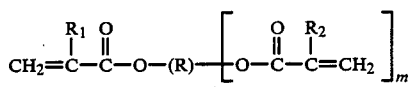

where R is the hydroxy free residue of a polyol and $R_1$, and $R_2$ are independently hydrogen or methyl and m is from 1 to 3, and
(aii) an acrylate characterized by the empirical formula:

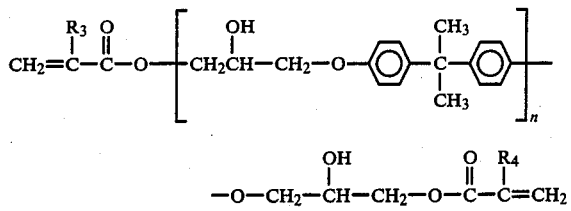

where n is from 1 to 1.5 and $R_3$ and $R_4$ are independently hydrogen or methyl
(b) from 90 to 30 parts by weight of an ethylenically unsaturated monomer which is soluble in and copolymerizable with said acrylate monomer, such that the total of said (a) plus said (b) is 100 parts by weight, and
(c) from 1.0 to 50 parts by weight of a selected nitrile rubber per 100 parts combined weight of said acrylate monomer plus said ethylenically unsaturated monomer, and
(d) from 0.2 to 3 parts by weight per 100 parts combined weight of said acrylate monomer plus said ethylenically unsaturated monomer of a free radical curing agent, characterized in that said selected nitrile rubber is selected from the group consisting of:
(i) a solid, rubbery copolymer of a $C_{3-5}$, unsaturated nitrile and a $C_{4-6}$ conjugated diene, said copolymer having a Mooney viscosity ($M_L 1+4$ at 100° C.) of from 20 to 100;
(ii) a solid carboxylated rubber copolymer of acrylonitrile, butadiene and at least one carboxylic acid selected from acrylic, methacrylic, fumaric, maleic and itaconic acid, said carboxylated rubbery copolymer having a Mooney viscosity ($M_L 1+4$ at 100° C.) of from 20 to 100; and
(iii) a liquid copolymer of acrylonitrile and butadiene having a molecular weight of less than 30,000 and terminal vinyl functional groups.

2. The composition of claim 1 further containing from 10 to 70 weight per cent of reinforcing fibers selected from glass fibers, polyamide fibers and polyaramid fibers.

3. The composition of claim 1 further containing from 10 to 70 weight per cent of one or more additives selected from clay, talc, calcium carbonate, carbon black, and titanium oxide.

4. The composition of claim 1 wherein said acrylate monomer is ethoxylated bisphenol-A dimethacrylate and said ethylenically unsaturated monomer is styrene.

5. The composition of claim 4 wherein said nitrile rubber is a solid copolymer of acrylonitrile and butadiene having from 33 to 38 weight per cent bound acrylonitrile monomer units and the balance to 100 weight per cent of bound butadiene units, and a Mooney viscosity ($M_L 1+4$ at 100° C.) of from 35 to 85.

6. The composition of claim 5 further containing from 20 to 50 weight per cent of fiberglass.

7. The composition of claim 6 wherein said free radical curing agent is from 0.8 to 1.2 weight per cent of tertiary butyl perbenzoate.

8. The composition of claim 1 wherein said acrylatre monomer is a mixture of ethoxylated bisphenol-A dimethacrylate and trimethylolpropanetrimethacrylate.

9. The composition of claim 8 wherein said ethylenically unsaturated monomer is styrene.

* * * * *